Patented Nov. 11, 1947

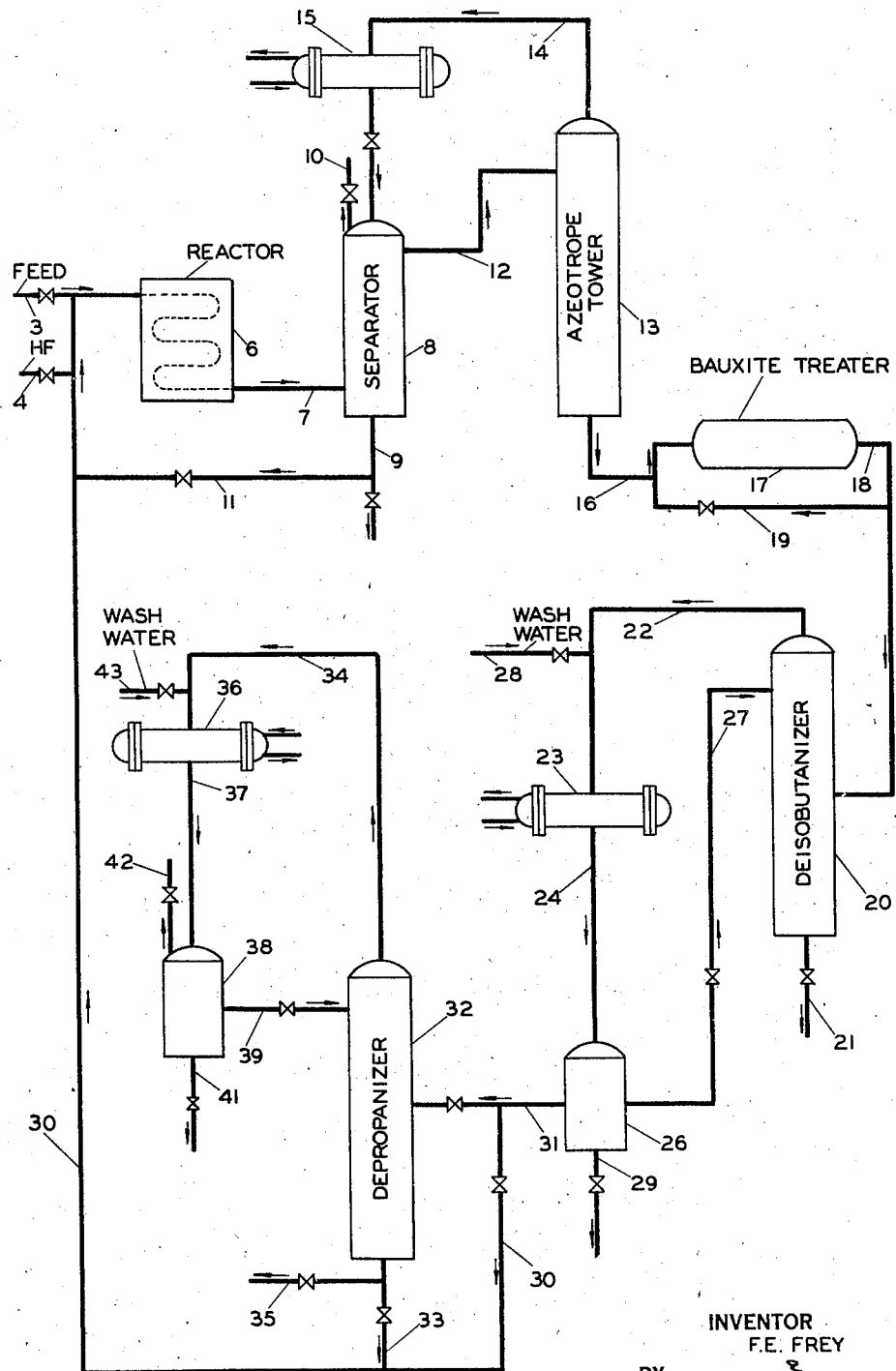

2,430,460

UNITED STATES PATENT OFFICE 2,430,460

PREVENTION OF SILICEOUS DEPOSITS IN PROCESSES WHEREIN HYDROCARBONS ARE CONTACTED WITH ORGANIC FLUORINE-REMOVING MATERIAL CONTAINING SILICA

Frederick E. Frey, Bartlesville, Okla., assignor to Phillips Petroleum Company, a corporation of Delaware Application June 26, 1945, Serial No. 601,655

7 Claims. (Cl. 260—683.4)

This invention relates to the treatment of hydrocarbon materials. In one particular embodiment this invention relates to the removal and prevention of siliceous deposits which may accumulate in condensers used in the fractionation of hydrocarbons. In a particular aspect this invention relates to the removal of siliceous deposits formed in connection with the conversion of hydrocarbons in the presence of fluorine-containing catalysts.

In the manufacture of hydrocarbons by processes in which fluorine-containing catalysts are used, small proportions of organic fluorine-containing by-products are formed. These processes may involve reactions such as polymerization and alkylation of relatively low-boiling hydrocarbons to produce motor-fuel hydrocarbons in the presence of catalysts comprising one or more of such fluorine compounds as hydrofluoric acid, boron trifluoride, or the like. Although the exact nature or composition of the organic fluorine-containing by-products which may be formed has not been definitely established, they are believed to be predominantly alkyl and/or aryl fluorides. They are not completely removed by washing the hydrocarbons with alkali solutions. They tend to decompose at elevated temperatures, such as those employed in fractional distillation of the hydrocarbons, thereby forming hydrofluoric acid, which is corrosive, especially in the presence of moisture. In gases, they may thus cause corrosion of handling equipment; in liquid motor-fuel hydrocarbons, they are undesirable for reasons that are obvious.

As discussed in Frey Patent 2,347,945, issued May 2, 1944, such organic fluorine compounds may be removed from hydrocarbon materials containing them by contacting such a hydrocarbon material with any one of a number of solid porous contact materials. Contact materials which have been found suitable include those known to be catalytically active for hydrogenation and dehydrogenation reactions such as alumina gel, activated alumina, dehydrated bauxite, chromium oxide, mixtures of alumina and chromium oxide, chromium ores comprising chromium oxide and ores of related materials such as those containing zirconia, limestone, magnesia, and the like. Such contact materials appear to adsorb preferentially the organic fluorine compounds although the exact mechanism involved is not known at present. Materials which contain large quantities of silicon dioxide or of various naturally occurring silicates are generally not suitable for such treatment, but many of the naturally occurring ores which can be so used contain appreciable amounts of silica or silicates. One such material which has found wide commercial use is hard granular bauxite. Such bauxite has a variable composition, which may be exemplified by the following typical analysis, in per cent by weight:

| Substance | Per Cent |
|---|---|
| $Al_2O_3$ | 77.5 |
| $SiO_2$ | 9.4 |
| $TiO_2$ | 3.4 |
| $Fe_2O_3$ | 6.0 |
| $H_2O$ | 1.7 |
| V. M. | 2.0 |
| Total | 100.0 |

The presence of silica is undesirable because it causes the formation of silicon tetrafluoride. Nevertheless, in practice bauxite containing up to 15 and even 20 per cent of silica has been used, in the absence of any alternative readily available and economical material. When the bauxite has become partially spent for such use and/or when the hydrocarbon material being treated is passed through the mass of contact agent at a high flow rate, it has been found that silicon tetrafluoride is present in the effluent; also, some water, which appears to be formed by reaction of the fluorine compounds with the bauxite, is present in the effluents. That is, after conversion of the hydrocarbons, either in the liquid or vapor phase, in the presence of fluorine-containing catalysts, such as hydrogen fluoride, boron trifluoride, or the like, silicon tetrafluoride is formed when the hydrocarbon conversion effluent is contacted with contact materials containing minor proportions of silica.

It is necessary, in most cases, to remove the organic fluorine compounds by contacting the hydrocarbon effluent with a suitable contact material; but as a result of this treatment silicon tetrafluoride and water are liberated by the reaction of hydrogen fluoride or the organic fluorine compounds with silica present as an impurity in the contact material. Typical equations of reactions which may occur in the treatment of the effluent with bauxite are:

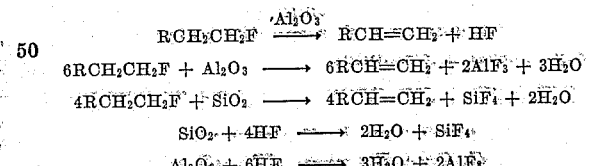

Although bauxite has been referred to in particular, any type of contact material suitable for the adsorption of organic fluorine compounds in which minor proportions of silica are present are within the scope of this invention.

After being formed, the water and the silicon tetrafluoride are conveyed along with the hydrocarbon effluent from the contact material to subsequent treating equipment, which is usually fractionating equipment. The water and silicon tetrafluoride accumulate in the overhead fractions from the various fractionators, since they comprise some of the low-boiling components of the hydrocarbon effluent. In consequence, trouble is experienced in the subsequent treating equipment as a result of the silicon tetrafluoride reacting with water to form various siliceous solid deposits. When the effluent of the bauxite treating step just discussed is in the liquid phase, and the proportions of silicon tetrafluoride and water are so small that these materials are completely dissolved, relatively little or only minor trouble may be experienced, if any. However, when much of the heavier hydrocarbon materials have been removed by fractional distillation so that the concentrations of the silicon tetrafluoride and the water are increased, and especially when the temperature is so low that free liquid water separates from the hydrocarbon mixture, the silicon tetrafluoride reacts with the water, forming siliceous solids that accumulate, thereby partially or completely plugging equipment and necessitating an expensive shut-down and interruption of production in order to remove the siliceous deposits. Sometimes the deposits form in the condenser of the first fractionator, such as the deisobutanizer; sometimes the deposits may not form until the effluent has reached the condenser of the second fractionator, such as a depropanizer; sometimes the deposits form in the condensers of all the fractionators.

The deposits appear to vary with the proportions of water and silicon tetrafluoride in the hydrocarbon stream; and these proportions in turn vary with such factors as the degree of spending of the bauxite. Apparently, the deposition is favored markedly by increase in the water content of the hydrocarbon stream, and it is thought that only minor hydrolysis of silicon tetrafluoride occurs when the hydrocarbon stream is less than 35 per cent saturated with water.

The amount of organic fluorine present in the charge to the treating step for the removal of fluorine compounds generally is not more than about 0.1 per cent by weight and often is not more than 0.001 to 0.05 per cent by weight. Most of this organic fluorine is retained by the treating agent, and the silicon tetrafluoride in the effluent from this treating step generally is less than about 0.01 per cent by weight, and often it is less than 0.0005 per cent by weight. Nevertheless, in commercial plants, wherein several hundred barrels of hydrocarbons are treated per day and the silicon tetrafluoride reacts with water to form solid siliceous deposits in one specific location, such as the condenser and accumulator of a deisobutanizer or a depropanizer, the amount of solid siliceous material accumulated over a period of a few weeks or a few months amounts to a very substantial amount.

Although silicon tetrafluoride may be removed from hydrocarbons by scrubbing with aqueous solutions as described in the copending application of R. C. Cole, Serial No. 574,760, filed January 26, 1945, or with pure water, further plugging difficulties originate from precipitation of hydrated silica in the scrubbing solution itself to such an extent that the scrubbing solution must be filtered or discarded. Filtration of suspensions of hydrated silica is difficult because of the gelatinous nature of the silica. Furthermore, when scrubbing solutions prepared from natural waters are used, which contain salts of metals, such as calcium, capable of forming insoluble fluorides, calcium fluoride, or other insoluble fluorides, which are also difficult to remove by filtration, precipitate. It is much to be desired, therefore, to provide a method for preventing the precipitation of the insoluble fluorides in the aqueous scrubbing solution.

This invention constitutes an improvement to the aforementioned copending application, Serial No. 574,760, for the removal of siliceous deposits accumulating in fractionation equipment used for separation of the various components of the conversion effluent from a process catalyzed by a fluorine-containing catalyst. The various difficulties arising during the scrubbing operation for the removal of siliceous deposits, as previously described hereinbefore, are eliminated by the practice of this invention whereby extra filtration equipment, personnel, costs of materials, etc., can be substantially decreased.

An object of the present invention is to provide a process for the removal and prevention of siliceous deposits in condensers of fractionating equipment used in connection with the conversion of hydrocarbons.

It is also an object to prevent the plugging of condensers and tubing wherein siliceous deposits are accumulated.

Another object is to prevent the corrosion of fractionating equipment caused by the liberation of acids in the condensers and tubing of the fractionating equipment.

An object of this invention is to prevent the precipitation of deposits in the scrubbing solution itself used to remove siliceous deposits accumulating in fractionation equipment in connection with the conversion of hydrocarbons.

It is a further object to decrease the quantity of scrubbing solution necessary to remove siliceous deposits from various equipment in which such deposits accumulate.

A still further object is to provide an accurate method for controlling the conditions required for removal of siliceous deposits from fractionation equipment in connection with a hydrocarbon conversion process.

Still another object is to provide a method for the separation of silicon tetrafluoride from a hydrocarbon mixture.

Other objects and advantages will appear obvious to those skilled in the art from the accompanying disclosure and description.

According to this invention, siliceous deposits in condensers of fractionating columns used in hydrocarbon conversion processes are removed and/or prevented by introduction of an aqueous solution comprising water and a suitable solute into the vaporous hydrocarbon streams entering the condensers, or into the condensers themselves, and by maintaining the pH of said aqueous solution during the treatment above about 4, preferably between about 5 and about 10. It has further been found that a sufficient quantity of the aqueous scrubbing solution should be added to the vaporous hydrocarbon stream to maintain the concentration of absorbed silicon tetrafluoride in the scrubbing solution itself preferably at not more than about 1 per cent by weight, and more preferably at not more than about 0.4 per cent by weight. By using the particular solutes and the particular conditions of operation hereinafter described, accumulation of siliceous deposits is prevented and substantially no hydrated silica precipitates in the scrubbing solution. The amount of aqueous solution necessary to remove the siliceous deposits at any particular place depends primarily on the amount of silicon tetrafluoride contained in the hydrocarbon stream. As a general rule, the amount of aqueous solution to be used is from 1 to 4 barrels per pound of silicon tetrafluoride, but the optimum amount varies with such factors as the extent of spending of the bauxite, the rate of hydrocarbon flow, the content of organic fluorine, the size and the type of condensers, and the like; the optimum amount can be readily determined for any particular set of factors by trial. The water carrying the siliceous materials which may accumulate therein is separated and removed from the liquefied hydrocarbon stream leaving the condenser.

Suitable solutes for maintaining the preferable range of pH for the aqueous solution during the treatment of the hydrocarbon stream are ammonia, hydroxides, and buffer compounds and mixtures. Such buffer compounds include in particular the acetates of the alkali metals, such as sodium acetate, and, most preferably, borax. Although borax is preferred because of its buffer action and its comparatively low cost, in general any solute which has sufficient buffering action or is sufficiently basic to maintain the pH of the aqueous solution during treatment within the preferred range is within the scope of this invention. Generally, the concentration of the solute in the aqueous solution is within the range of about 0.01 to about 3.0 per cent by weight; however, the optimum amount will depend upon various factors, such as the basicity of the solute itself, and may be determined by trial for any set of conditions. A satisfactory initial concentration of borax is from about 0.5 to about 2 per cent by weight, preferably a concentration of about 1 per cent by weight, but any desired concentration may be used provided the pH range of the scrubbing solution is maintained between about 4 and about 10.

The presence of sodium hexametaphosphate (NaPO$_3$)$_6$ in the aqueous scrubbing solution has been found to be particularly beneficial to the treating or scrubbing process. The addition of sodium hexametaphosphate to the aqueous solution prevents the precipitation of insoluble fluorides which may result from the presence of dissolved impurities in the aqueous solution, such as salts of metals, particularly the calcium and magnesium salts. By using sodium hexametaphosphate the necessity for pretreatment or purification of the aqueous solvent or water to rid it of the salts of metals which may precipitate as insoluble fluorides during the scrubbing treatment of the hydrocarbon stream may be eliminated. For example, when the aqueous solution contains both borax and calcium, it is highly desirable to introduce sodium hexametaphosphate into the aqueous solution to prevent or substantially decrease the precipitation of calcium borate. The quantity of sodium hexametaphosphate added to the aqueous solution is generally within the range of about 0.01 to about 3.0 per cent by weight of the aqueous solution, most preferably within about 0.02 to about 0.10 per cent by weight, although a larger quantity may be used, if desired. The minimum concentration of sodium hexametaphosphate necessary to prevent the precipitation of calcium borate or of insoluble fluorides depends upon the specific composition of the aqueous solution used and can be readily determined by trial; in general, the minimum amount of sodium hexametaphosphate is about 0.01 per cent by weight of the aqueous solution or more.

The following equations are illustrative of reactions involved in the hydrolysis of silicon tetrafluoride:

$$SiF_4 + 4H_2O \longrightarrow H_4SiO_4 + 4HF$$

Orthosilicic acid $$\downarrow$$

$$H_2SiO_3 + H_2O$$

Metasilicic acid $$\downarrow$$

$$SiO_2 + H_2O$$

Silicon dioxide $$3SiF_4 + 2H_2O \longrightarrow 2H_2SiF_6 + SiO_2$$

Fluosilicic acid $$H_2SiF_6 + 4H_2O \longrightarrow 6HF + H_4SiO_4$$

The formation of orthosilicic acid results in a gel-type deposit which tends to accumulate and plug the condenser tubing and reflux pipes and valves. Under appropriate conditions orthosilicic acid decomposes to metasilicic acid or silicon dioxide, which are precipitates and which also obstruct the passage of hydrocarbons through the condensers and tubings of the fractionating equipment. The silicic acids and silicon dioxide are moderately soluble in water but have practically no solubility in the hydrocarbon material. Fluosilicic acid is soluble in water and is substantially electrolytic; consequently it is relatively corrosive to the metal tubing and equipment of the fractionator. The hydrogen fluoride liberated in the hydrolysis of silicon tetrafluoride and of fluosilicic acid is also corrosive to the equipment in the presence of water. It is, therefore, much to be desired to remove these deposits and corrosive materials as quickly as possible from the fractionating equipment.

According to the invention such deposits and corrosive materials are removed or prevented from forming by a continuous controlled aqueous solution wash and draw-off. In one embodiment, the aqueous solution is preferably injected into the hydrocarbon vapor line ahead of the point at which the deposits are formed in the absence of such treatment, such as before the vaporous stream of hydrocarbons enters the condenser of a fractionating column. The quantity of aqueous solution injected is usually in excess of that which will be vaporized by the hot hydrocarbon vapors. The excess water prevents precipitation of solid hydrolysis products on the uppermost tubes in the condenser by a washing action or by a solution effect on the products. The aqueous solution also hydrolyzes substantially all of the silicon tetrafluoride in the hydrocarbon stream at this point and thereby prevents a carry-over of the silicon tetrafluoride to subsequent fractionating columns or to the return reflux conduit. The aqueous solution, after passing through and washing those portions of the equipment where deposits tend to be formed, accumulates or is withdrawn in an appropriate manner so as to remove all of the hydrolysis products. In the case of injecting the aqueous solution into the condenser, the aqueous solution is accumulated in the reflux accumulator and is withdrawn at a rate sufficient to prevent accumulation of hydrolysis products within the accumulator.

Since certain of the hydrolysis products, such as hydrogen fluoride and fluosilicic acid are acidic and corrosive, sufficient quantities of a basic compound, or a buffer or mixtures thereof, are normally dissolved in the aqueous solution to control the pH, or the hydrogen ion concentration, of the effluent solution within the relatively non-corrosive ranges. It is, therefore, preferable to have the aqueous solution during the treatment of the hydrocarbon stream and thereafter at a pH of about 5 to about 10. For example, ammonia may be injected simultaneously with the aqueous solution or water in sufficient quantity to control the pH of the effluent solution, as desired. It is preferred, however, that the aqueous solution be made basic, so as to neutralize the acids, prior to its injection into the hydrocarbon stream. Thus, the aqueous solution will comprise water, a suitable solute to maintain the desired pH, and, preferably in most instances, from about 0.01 to about 3 per cent sodium hexametaphosphate.

The drawing represents diagrammatically one arrangement of apparatus in which one embodiment of the present invention may be practiced. This embodiment includes a liquid-phase alkylation of hydrocarbons in which hydrogen fluoride is used as the catalyst. The hydrocarbon feed, comprising a mixture of low-boiling isoparaffins and olefins, enters reactor 6 through line 3. Any desired type of reaction chamber or series of chambers may be employed without departing from this invention. Hydrogen fluoride catalyst is introduced through lines 4 and 30 to reactor 6. Alkylation of the hydrocarbons is accomplished under known conditions of pressure, temperature, and residence time in reactor 6. The effluent therefrom passes through line 7 into separator 8, in which it separates into two liquid phases, a hydrocarbon phase and a heavier hydrogen fluoride phase. The liquid hydrogen fluoride phase is withdrawn from separator 8 through line 9 for purification (not shown) as desired, or may be recycled as a catalyst through line 11 to line 30 for reintroduction into reactor 6. If the light gases tend to accumulate in separator 8 they may be vented through line 10. The liquid hydrocarbon phase, containing some dissolved hydrogen fluoride, passes from separator 8 to azeotrope tower 13 by line 12. Separation of a more or less azeotropic mixture of hydrocarbons and hydrogen fluoride is effected in fractionation tower 13. This azeotropic mixture passes as a vapor from tower 13 through line 14 and condenser 15 to separator 8. A liquid hydrocarbon stream, substantially free from hydrogen fluoride but containing organic fluorine compounds formed during the alkylation reaction, passes from the bottom of tower 13 through line 16 to treater 17. These organic fluorine compounds, which are formed as by-products of the hydrocarbon conversion, are removed by treatment with a suitable contact material, such as bauxite or alumina in treater 17. When siliceous material, such as silica or various natural silicates, is present in the contact material, silicon tetrafluoride and water may be formed and will appear in the effluent when the contact material is partially spent and/or when an economically desirable high flow rate is used.

Water formed during defluorination is generally present in the resulting effluent in an amount less than that required to saturate the liquid effluent, i. e., less than about one per cent by weight; while silicon tetrafluoride is usually present in an amount less than about 0.01 per cent by weight.

The effluent, now substantially free from organic fluorine compounds but containing silicon tetrafluoride and water as impurities, passes to deisobutanizer 20 by line 18. In most cases this stream is completely in the liquid phase and contains such relatively small proportions of silicon tetrafluoride and of water that these impurities are completely dissolved in the liquid phase. A portion of this stream may be recycled to the bauxite treater through line 19 if desired, although this is not essential. Normal butane and heavier hydrocarbons are separated from isobutane and lighter hydrocarbons in deisobutanizer 20, which is a fractionating column complete with condenser 23 and accumulator 26, and are withdrawn from deisobutanizer 20 by line 21. If desired, the butane and heavier hydrocarbons are conveyed to subsequent fractionators and process equipment (not shown) for separation of the butane and alkylation products; also, a portion of the butane and heavier hydrocarbons from deisobutanizer 20 may be recycled to reactor 6. The overhead product from deisobutanizer 20, comprising isobutane and lighter hydrocarbons, passes therefrom through line 22, condenser 23, and line 24 into accumulator 26. Vaporous hydrocarbons are condensed in condenser 23 and accumulate as a liquid in accumulator 26. A portion of the liquid hydrocarbons from accumulator 26 is returned through line 27 to deisobutanizer 20 as reflux therefor.

If conditions of temperature and pressure within accumulator 26 and condenser 23 are appropriate, particularly if the solubility of the water in the hydrocarbon is decreased sufficiently to form a separate liquid water phase, siliceous deposits accumulate in condenser 23 and accumulator 26, and sometimes in line 27 and subsequent fractionating equipment through which the hydrocarbon stream is passed. In order to remove and/or prevent the accumulation of the siliceous deposits according to this invention, a suitable aqueous solution hereinbefore described is injected into the hydrocarbon stream, preferably at the point shown by line 28, in sufficient proportion to wash the condenser and to remove or dissolve hydrolysis products of silicon tetrafluoride therefrom. The proportion of aqueous solution is usually preferably within the range of 1 to 4 barrels of solution per pound of silicon tetrafluoride in the hydrocarbon stream at this point, but smaller or larger proportions may be adequate or necessary in particular instances. It may be sufficient in some cases to inject the aqueous solution directly into accumulator 26. The aqueous solution and condensed hydrocarbons flow from condenser 23 through line 24 into accumulator 26. The aqueous solution which contains entrained or dissolved hydrolysis products of silicon tetrafluoride is withdrawn through line 29. Obviously, the solution may be injected at any effective point and in any effective manner without departing from the scope of this invention. As previously stated, this solution comprises water, a suitable basic compound as the solute, such as borax, and when borax is the solute sodium hexametaphosphate in particular.

At least a portion, and ordinarily all, of the overhead product from deisobutanizer 20 passes from accumulator 26 into depropanizer 32 by line 31 for separation of isobutane from propane and lighter hydrocarbons. Isobutane, which is incidentally dried as a result of the depropanization, is removed from the bottom of depropanizer 32 and may be withdrawn through line 35 or recycled by lines 33 and 30 to reactor 6, as circumstances may require. The overhead fraction comprising propane and lighter hydrocarbons from depropanizer 32 passes to condenser 36 through line 34. From condenser 36 the condensed hydrocarbons and vapors pass to accumulator 38 through line 37. Some of the liquid hydrocarbon is returned to depropanizer 32 through line 39 as reflux. Propane and other light hydrocarbons are withdrawn from accumulator 38 through line 42. If desired, part or even all of the overhead product from deisobutanizer 20 may be recycled to reactor 6, as by passing from accumulator 26 through lines 31 and 30, particularly when the proportion of propane and lighter hydrocarbons is relatively small; in such case, a drier should be provided to remove water from this recycled part.

Frequently in the operation of alkylation processes the accumulation of siliceous deposits in the condenser and tubing of the depropanizing equipment becomes so serious as to curtail the capacity thereof. In turn, because of the resultant insufficient removal of propane and lighter gases, continuation of the operation necessitates resorting to increased venting of such gases through line 10 from separator 8 in order to maintain a pressure within the operating limits. This extra venting adversely affects the operation by increased hydrogen fluoride consumption and the loss of valuable iso- and normal butanes. Usually the most serious accumulation and formation of siliceous deposits is ordinarily observed in the depropanizing equipment, wherein the conditions of temperature and pressure and water concentration are more often such as to form a separate water phase in the condenser, accumulator, and even on some of the fractionating plates of depropanizing column 32. Therefore, according to a specific embodiment of this invention, an aqueous solution suitable for maintaining the pH, etc., as described should be injected at this location to remove and prevent the accumulation of the siliceous deposits.

An aqueous solution is injected through line 43 preceding condenser 36. Solution and hydrocarbons pass from condenser 36 through line 37 into accumulator 38, and the solution is withdrawn from accumulator 38 by line 41.

As previously discussed, the pH of the wash solution is adjusted so that the acidity of the effluent wash solution will be in the noncorrosive range, as by using a suitable basic compound, or a buffer, such as borax, in combination with a suitable quantity of hexametaphosphate.

The injection of such an aqueous solution into the hydrocarbon stream not only removes or prevents the accumulation of the siliceous deposits but also substantially removes all of the silicon tetrafluoride in the hydrocarbon stream. In normal practice some of the silicon tetrafluoride would be recycled to the fractionator with the reflux and, if water is present in the reflux or on the plates of the fractionating tower, siliceous deposits form in the tower itself. Often this is evidenced by siliceous deposits on the top fractionating plate and by deposits in decreasing amounts on succeeding plates down the tower. By a substantially complete removal of the silicon tetrafluoride none can be recycled through the reflux and thus the elimination or at least minimization of siliceous deposits in the tower itself is accomplished. Complete removal of silicon tetrafluoride from the hydrocarbon stream also prevents the carry-over and the formation of further deposits in subsequent equipment.

In case deposits are noticed in both deisobutanizing and depropanizing equipment, the aqueous solution may be injected, as previously described, in both places. The injection is preferably continuous; intermittent injection is also effective, but requires relatively more frequent inspections and control changes.

The present invention may be applied in many processes in which silicon tetrafluoride is present and in which it hydrolyzes, owing to the presence of water, to form siliceous deposits. Although specific data contained herein relate to hydrocarbon conversion processes, the present invention is not limited or restricted to such processes in its broadest aspects; it is also not restricted in all instances to the source of the silicon tetrafluoride or to the location of the siliceous deposits.

EXAMPLE I

Isobutane feeds containing small amounts of silicon tetrafluoride were vaporized and scrubbed with aqueous buffer solutions. The volume of effluent butane and the pH of the scrubbing solutions were measured from time to time. The data obtained are shown in Table I.

*Table I*

| $SiF_4$ in i-$C_4H_{10}$, wt. Per Cent | Initial pH of Scrubbing Solution | pH of Scrubbing Solution when Silica Began to Precipitate | $SiF_4$ Absorbed before Precipitation of Silica, wt. Per Cent of Scrubbing Solution | Vol. Gas Scrubbed per Vol. Scrubbing Solution |
|---|---|---|---|---|
| 0.0095 | 2.3 | 2.2 | 0.23 | 340 |
| 0.0068 | 4.0 | 2.7 | 0.14 | 680 |
| 0.0096 | 6.1 | 3.9 | 0.43 | 980 |
| 0.0082 | 8.0 | 1.5 | 0.59 | 1900 |

The data in Table I show that, at initial pH values greater than 4, a given volume of scrubbing solution absorbs approximately 3 times as much silicon tetrafluoride, without precipitation of silica, as at pH values less than 4.

EXAMPLE II

Isobutane containing 0.016 weight per cent silicon tetrafluoride was vaporized and contacted with an aqueous solution containing 1 per cent borax, 0.05 per cent calcium chloride, and 0.02 per cent sodium hexameta-phosphate. The initial pH of the solution was 9.3. After 1700 volumes of the vapor per volume of solution had been scrubbed and the pH of the solution had decreased to 2.0, silica began to precipitate. No calcium salts, however, precipitated, even when the solution was neutralized and boiled. The removal of silicon tetrafluoride from the isobutane was substantially complete, and the amount absorbed was 0.93 weight per cent of the scrubbing solution.

EXAMPLE III

Three different batches of isobutane containing silicon tetrafluoride were vaporized and were scrubbed with aqueous alkaline solutions. The volume of effluent vapor and the pH of the scrubbing solution were measured from time to time. After precipitation of silica in the solutions had begun, the amount of silicon tetrafluoride absorbed by each was determined. The data obtained are given in Table II.

*Table II*

RUN 2. SiF₄ IN i-C₄H₁₀, 0.0097 WT. PER CENT; SCRUBBING SOLUTION, AQUEOUS NH₄OH, 0.025 WT. PER CENT

| Total Time, min. | Vol. Gas Scrubbed per vol. Scrubbing Solution | pH of Scrubbing Solution | SiF₄ Absorbed, wt. per cent of Scrubbing Solution | Further Observations |
|---|---|---|---|---|
| 0 | 0 | 9.3 | 0.00 | |
| 11 | 340 | 2.7 | | No precipitation. |
| 17 | 530 | 2.1 | | Slight precipitation of silica. |
| 29 | 1,040 | 1.4 | 0.43 | Increased precipitation of silica. |

RUN 3. SiF₄ IN i-C₄H₁₀, 0.005 WT. PER CENT; SCRUBBING SOLUTION, AQUEOUS NaOH, 0.07 WT. PER CENT

| | | | | |
|---|---|---|---|---|
| 0 | 0 | 9.1 | 0.00 | |
| 6 | 170 | 2.7 | | No precipitation. |
| 23 | 850 | 2.1 | | Do. |
| 80 | 3,200 | 1.8 | 0.38 | Slight precipitation of silica. |

RUN 4. SiF₄ IN i-C₄H₁₀, 0.0083 WT. PER CENT; SCRUBBING SOLUTION, AQUEOUS BORAX SOLUTION 1 WT. PER CENT

| | | | | |
|---|---|---|---|---|
| 0 | 0 | 9.3 | 0.00 | |
| 8 | 340 | 7.8 | | No precipitation. |
| 19 | 700 | 5.5 | | Do. |
| 35 | 1,360 | 5.0 | 0.43 | Slight precipitation of silica. |

The data in Table II show that, when the scrubbing solutions had absorbed approximately 0.4 weight per cent silicon tetrafluoride, silica began to precipitate. The data of run 4 illustrate the capacity of borax to resist pH change; when ammonium hydroxide and sodium hydroxide solutions were used the absorption of approximately 0.4 weight per cent silicon tetrafluoride lowered the pH from more than 9 to less than 2, whereas, when a borax solution was used, approximately the same quantity of silicon tetrafluoride lowered the pH from 9.3 to 5.0.

EXAMPLE IV

The acid-free hydrocarbon effluent from a hydrofluoric acid alkylation unit contains 0.02 weight per cent organic fluorine. After the effluent has been contacted with calcined bauxite, which contains 5 per cent silica, at 180° F., the organic fluorine content is reduced to 0.001 weight per cent, but the treated effluent contains 0.003 weight per cent silicon tetrafluoride. The effluent is passed to a fractionating column from which butanes are withdrawn as overhead vapor. The overhead vapor, which contains most of the silicon tetrafluoride, is passed to a scrubber in which it is countercurrently contacted with a solution prepared by dissolving borax and sodium hexametaphosphate in natural water which originally had a calcium content of 200 parts per million. By continuous addition of fresh scrubbing solution and rejection of part of the used solution, the pH is maintained at approximately 8, the content of sodium hexametaphosphate at approximately 0.05 weight per cent, and the concentration of absorbed silicon tetrafluoride at approximately 0.2 weight per cent. No precipitate is formed in the scrubbing solution, and the scrubbed butane is substantially free from silicon tetrafluoride.

Having described a preferred form of the invention and having pointed out the principal considerations to be observed in its operation, and in operation of equivalent systems, it is obvious that various other changes can be made without departing from the scope of the invention.

I claim:
1. In a process involving the conversion of hydrocarbons in the presence of a fluorine-containing catalyst in which a liquid hydrocarbon conversion effluent is contacted with an organic fluorine-removing material containing minor proportions of silica and thereby is contaminated with water which is present in an amount less than about 1 per cent by weight and with silicon tetrafluoride which is present in an amount less than about 0.1 per cent by weight, and in which components of a resulting hydrocarbon effluent are separated by fractional distillation under conditions such that said silicon tetrafluoride is hydrolyzed to form gelatinous siliceous deposits by the condensation of a relatively low-boiling fraction from said fractional distillation, the method for preventing accumulation of said gelatinous siliceous deposits which comprises introducing an aqueous solution containing about 0.01 to about 3 per cent by weight of sodium hexametaphosphate dissolved therein directly into said relatively low-boiling fraction, said aqueous solution being introduced in a sufficient amount such that said solution absorbs not more than about 0.4 per cent of its own weight of silicon tetrafluoride, maintaining the pH of said aqueous solution above about 4 by adding thereto an alkaline compound, and withdrawing a solution containing hydrolysis products of silicon tetrafluoride therein.

2. The process of claim 1 in which said alkaline compound comprises borax.

3. The process of claim 1 in which said alkaline compound comprises an acetate of an alkali metal.

4. In a process involving the alkylation of isobutane in the presence of a hydrofluoric acid alkylation catalyst in which a liquid hydrocarbon conversion effluent is contacted with bauxite containing minor proportions of silica to remove organic fluorine compounds formed during said conversion and thereby is contaminated with water which is present in an amount less than about 1 per cent by weight and with silicon tetrafluoride which is present in an amount less than about 0.1 per cent by weight, and in which butane and heavier hydrocarbons and propane and lighter hydrocarbons are separated from a resulting hydrocarbon effluent by fractional distillation under conditions such that said silicon tetrafluoride is hydrolyzed to form gelatinous siliceous deposits during condensation of an overhead fraction from said fractional distillation, the method for preventing accumulation of said gelatinous siliceous deposits which comprises injecting an aqueous solution containing a sufficient quantity of sodium hexametaphosphate to prevent said accumulation of gelatinous siliceous deposits directly into said overhead fraction, said aqueous solution being introduced in an amount of about 1 to about 4 barrels of aqueous solution per pound of silicon tetrafluoride present in said overhead fraction, maintaining the pH of said aqueous solution within a range of about 5 to about 10 prior to the introduction into said fraction, and withdrawing a solution therefrom containing hydrolysis products of silicon tetrafluoride.

5. In a process involving the conversion of hydrocarbons in the presence of a fluorine-containing catalyst in which a liquid hydrocarbon conversion effluent is contacted with an organic fluorine-removing material containing minor proportions of silica and thereby is contaminated with water and with silicon tetrafluoride which is present in an amount less than about 0.1 per cent by weight, and in which components of a resulting hydrocarbon effluent are separated by fractional distillation under conditions such that said silicon tetrafluoride is hydrolyzed to form gelatinous siliceous deposits by the condensation of a relatively low-boiling fraction from said fractional distillation, the method for preventing accumulation of said gelatinous siliceous deposits which comprises introducing an aqueous solution containing sodium hexametaphosphate dissolved therein directly into said relatively low-boiling fraction, maintaining the pH of said aqueous solution above about 4 by adding borax thereto, and withdrawing a solution containing hydrolysis products of silicon tetrafluoride therein.

6. In a process involving the conversion of hydrocarbons in the presence of a fluorine-containing catalyst in which a liquid hydrocarbon conversion effluent is contacted with an organic fluorine-removing material containing minor proportions of silica and thereby is contaminated with water and with silicon tetrafluoride, and in which components of a resulting hydrocarbon effluent are separated by fractional distillation under conditions such that said silicon tetrafluoride is hydrolyzed to form gelatinous siliceous deposits by the condensation of a relatively low-boiling fraction from said fractional distillation, the method for preventing accumulation of said gelatinous siliceous deposits which comprises introducing an aqueous solution containing sodium hexametaphosphate dissolved therein directly into said relatively low-boiling fraction, and withdrawing a solution containing hydrolysis products of silicon tetrafluoride therein.

7. In a process involving the conversion of hydrocarbons in the presence of a fluorine-containing catalyst in which organic fluorine compounds formed during said conversion are separated from a hydrocarbon conversion effluent by contacting said effluent with a contact material containing minor proportions of silica under conditions such that silicon tetrafluoride in an amount not greater than about 0.1 per cent by weight contaminates a resulting effluent after said contacting, the method of removing said silicon tetrafluoride from said resulting effluent which comprises introducing directly into said effluent an aqueous solution containing sodium hexametaphosphate in an amount sufficient to prevent the accumulation of gelatinous siliceous deposits, said aqueous solution being introduced in a sufficient amount such that said solution absorbs not more than about 1 per cent of its own weight of silicon tetrafluoride, maintaining the pH of said aqueous solution above about 4 by adding borax to said aqueous solution, and withdrawing a solution containing hydrolysis products of silicon tetrafluoride therein.

FREDERICK E. FREY.

REFERENCES CITED

The following references are of record in the file of this patent:

UNITED STATES PATENTS

| Number | Name | Date |
|---|---|---|
| 2,347,945 | Frey | May 2, 1944 |

OTHER REFERENCES

Scientific American, March 1939, page 168. (Patent Office Library.)